(12) United States Patent
Krane et al.

(10) Patent No.: US 8,060,556 B2
(45) Date of Patent: Nov. 15, 2011

(54) SERVICE ENABLED TAGGED USER INTERFACES

(75) Inventors: Rolf Krane, Wiesloch (DE); Filip Misovski, Walldorf (DE)

(73) Assignee: SAP AG, Walldorf (DE)

( * ) Notice: Subject to any disclaimer, the term of this patent is extended or adjusted under 35 U.S.C. 154(b) by 591 days.

(21) Appl. No.: 11/643,386

(22) Filed: Dec. 20, 2006

(65) Prior Publication Data

US 2008/0098085 A1 Apr. 24, 2008

Related U.S. Application Data

(60) Provisional application No. 60/853,173, filed on Oct. 20, 2006.

(51) Int. Cl.
*G06F 15/16* (2006.01)
*G06F 17/00* (2006.01)

(52) U.S. Cl. .................... 709/203; 709/229; 715/234

(58) Field of Classification Search ................... 709/203, 709/229; 715/209, 234, 760, 762
See application file for complete search history.

(56) References Cited

U.S. PATENT DOCUMENTS 6,558,431 B1 * 5/2003 Lynch et al. .................. 715/210
6,990,653 B1 * 1/2006 Burd et al. .................... 717/108
7,555,707 B1 * 6/2009 Labarge et al. ............... 715/234

* cited by examiner

*Primary Examiner* — Peling Shaw
(74) *Attorney, Agent, or Firm* — Mintz, Levin, Cohn, Ferris, Glovsky and Popeo, P.C.

(57) ABSTRACT

In one aspect, in a computer-implemented method it is determined whether a placeholder corresponding to a service includes an identifier similar to a tag associated with an element of a user interface. The placeholder is replaced with a value of the element associated with the tag based on the results of the determining step. The service is called using the value. Information is received from the called service, the information corresponding to the element of user interface. Related systems, apparatus, methods, and/or articles are also described.

20 Claims, 9 Drawing Sheets

SERVICE ENABLED TAGGED USER INTERFACES

CROSS-REFERENCE TO RELATED APPLICATION

This application claims the benefit under 35 U.S.C. Section 119(e) of the following: U.S. Provisional Patent Application Ser. No. 60/853,173, entitled, "Service Enabled Tagged User Interface," filed Oct. 20, 2006, which is incorporated by reference herein.

FIELD

This disclosure relates generally to data processing, and, more particularly, to techniques for providing elements of a user interface with tags enabled for a service.

BACKGROUND

Advances or changes in how enterprises conduct business result from, for example, growing competition and globalization, mergers and acquisitions, or a revamping of business models. Successful advances and changes often depend on how quickly the enterprise's information technology (IT) organization adapts to evolving business needs.

One impediment to such advances is the construction and maintenance of user interfaces, which has become a central problem for large, complex systems. The user interface (or UI for short) serves as an interface between services and users. With the advent of new technologies and user-centered development, the user interface portion is becoming increasingly important as well as large and costly.

Faster and more capable machines and networks are providing users with more functionalities and more information, but at the same time are overwhelming them with more commands and options. User interfaces need to become more flexible to assist users in performing their tasks, to be easier and more intuitive to learn, and to allow user customization so they can be tailored to the specific user needs and preferences.

SUMMARY

The subject matter disclosed herein provides methods and apparatus, including computer program products, for providing elements of a user interface with tags enabled for a service.

In one aspect, in a computer-implemented method it is determined whether a placeholder corresponding to a service includes an identifier similar to a tag associated with an element of a user interface. The placeholder is replaced with a value of the element associated with the tag based on the results of the determining step. The service is called using the value. The information is received from the called service, the information corresponding to the element of the user interface.

In some variations, the computer-implemented method may determine whether a URL includes the placeholder including the identifier that is the same as the tag associated with the element of the user interface. The service may be selected from a repository. The placeholder may be set to a character string value associated with the tag. The identifier of the placeholder may be selected to be the same as the tag. The element of the user interface may be associated with the tag. The received information from a called service may be presented in a separate window. The called services may be one of the following: a web service, an enterprise service, and an application.

In an interrelated aspect, a computer-implemented method may be used to associate each of one or more user interface elements with one or more semantic identifiers; store the one or more semantic identifiers as one or more tags; and execute a selected user interface element by access to its associated one or more tags.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

In some implementations, the subject matter described herein may be implemented to realize the advantage of providing a user interface with elements enhanced with information provided by a service.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The implementations set forth in the following description do not represent all implementations consistent with the subject matter described herein. Instead, they are merely some examples consistent with certain aspects related to the described subject matter. Wherever possible, the same reference numbers will be used throughout the drawings to refer to the same or like parts.

Figure 1:
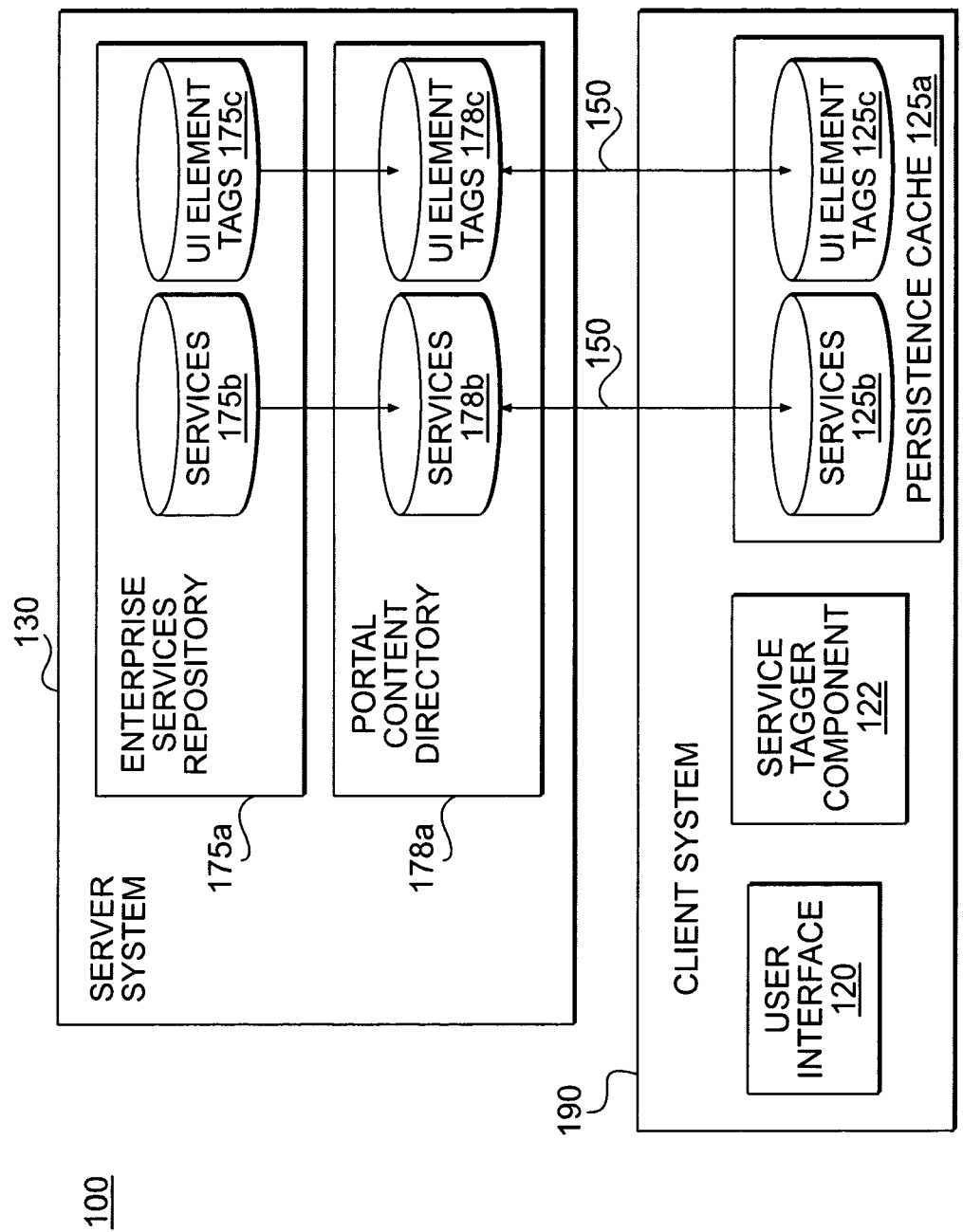
FIG. 1 illustrates a service enabled tagged user interface system.

FIG. 1 depicts an exemplary system 100 for providing a user interface (UI) with services enabled by tags (also referred to as UI element tags) associated with elements of the user interface. The system 100 includes a client system 190 and a server system 130. The client system 190 further includes an application, such as a user interface 120, a service tagger component 122, and a persistence cache 125a, which provides storage for services 125b and tags 125c.

The user interface 120 may be any application used to interface with other applications, such as services, web service, and the like. For example, the user interface 120 may include a browser or client application to interface with applications and services. The user interface 120 may utilize service tagger component 122 to provide services enabled by tags associated with elements of user interface 120. Although service tagger component 122 is depicted in FIG. 1 as separate from user interface 120, in some implementations, service tagger component 122 is embedded in user interface 120 (e.g., as a plug-in or component of user interface 120). In some implementations, user interface 120 is implemented as a small application, such as an applet or a Widget, i.e., a JavaScript runtime engine combined with an XML document structure that runs small applications, which can be stored in a repository or any other storage mechanism.

As used herein, a "tag" refers to data or a command used to describe an element of a user interface (e.g., an HTML tag, an XML tag, or any other semantic identifier or descriptive data). For example, the tag <Name> may be associated with an element of a user interface and may have a value, such as the character string "John" representative of a person's name. An element (i.e., a UI element) of a user interface refers to a portion of a user interface, such as a field, a button, a tool bar, and the like. When a user interface is designed, it may be designed by combining various elements, which may be associated with tags. Moreover, the tags (also referred to as UI element tags) may be used to enable calls to services, as described further with respect to FIG. 3, to provide a user interface with services enabled by the tags.

The service tagger component 122 may provide user interface 120 information from a service called based on a tag associated with an element (also referred to as a UI element) of user interface 120. The service may be called using an URL with a placeholder, which is replaced by the value of the element associated with the tag having the same name (or identifier) as the placeholder. The service may then respond to the call with information that can be provided to user interface 120.

When a user selects an element of user interface 120 (e.g., a field of user interface 120 associated with a tag "Name"), service tagger component 122 enhances user interface 120 by calling a service using an URL including one or more placeholders. The placeholders are each replaced by the value of a UI element. For example, the UI element may be tagged with "Name," while the URL may be as follows: http://myserver/images/employeepicture=$Name$. The placeholder in the URL is "$Name$." When a user selects the UI element (e.g., a search field) with the associated tag "Name," the service tagger component 122 replaces URL placeholder "Name" with the value of the element tagged "Name." The service tagger 122 (or user interface 120) may then call the service with the replaced value in the URL. Assuming that a user enters the name "Smith" in the UI element (e.g., the search field) of user interface 120 and that UI element has been tagged with "Name," the service tagger component 122 replaces the placeholder "Name" in the URL with "Smith" the value of the tagged UI element, resulting in the following URL for calling the service: http://myserver/images/employeepicture=Smith. In this example, the service returns an employee picture of Smith.

The service tagger component 122 may store services in a services repository 125b and save tags in tag repository 125c. The service tagger component 122 may also access through communication link 150 a portal content directory 178a at server 130. The service tagger component 122 may merge services 178b and tags 178c at portal content directory 178a to persistent cache 125a. A UI service repository may be used as well. A UI service may be an SAP application as well as any other UI service, e.g. a widget. A widget can not only display the content (e.g., values of input fields) of the related user interface in a different way, but in addition could also modify the content (e.g., a date picker). Each UI service is defined by its URL, a list of start parameters mapped to tags, and a list of UI elements mapped to tags. The information about such a UI service could be serialized into an XML file that can be cached on client side. In this case, the UI element tags are part of the UI service.

The persistent cache 125a provides a client-side cache. For example, when a user interface includes tags and a service or application includes placeholders, persistent cache 125a may include one or more files representative of the tags and the URL including placeholders. In some implementations, the persistent cache 125a may not be used. Instead, information (e.g., tags and the URL including placeholders) may be serialized into an XML file and stored at client 190 as part of user interface application 120.

Although FIG. 1 depicts both enterprise services repository 175a and portal content directory 178a, in some implementations only one of them is used. Moreover, in some implementations, enterprise services repository 175a and portal content directory 178a are integrated into a single mechanism.

Figure 2:
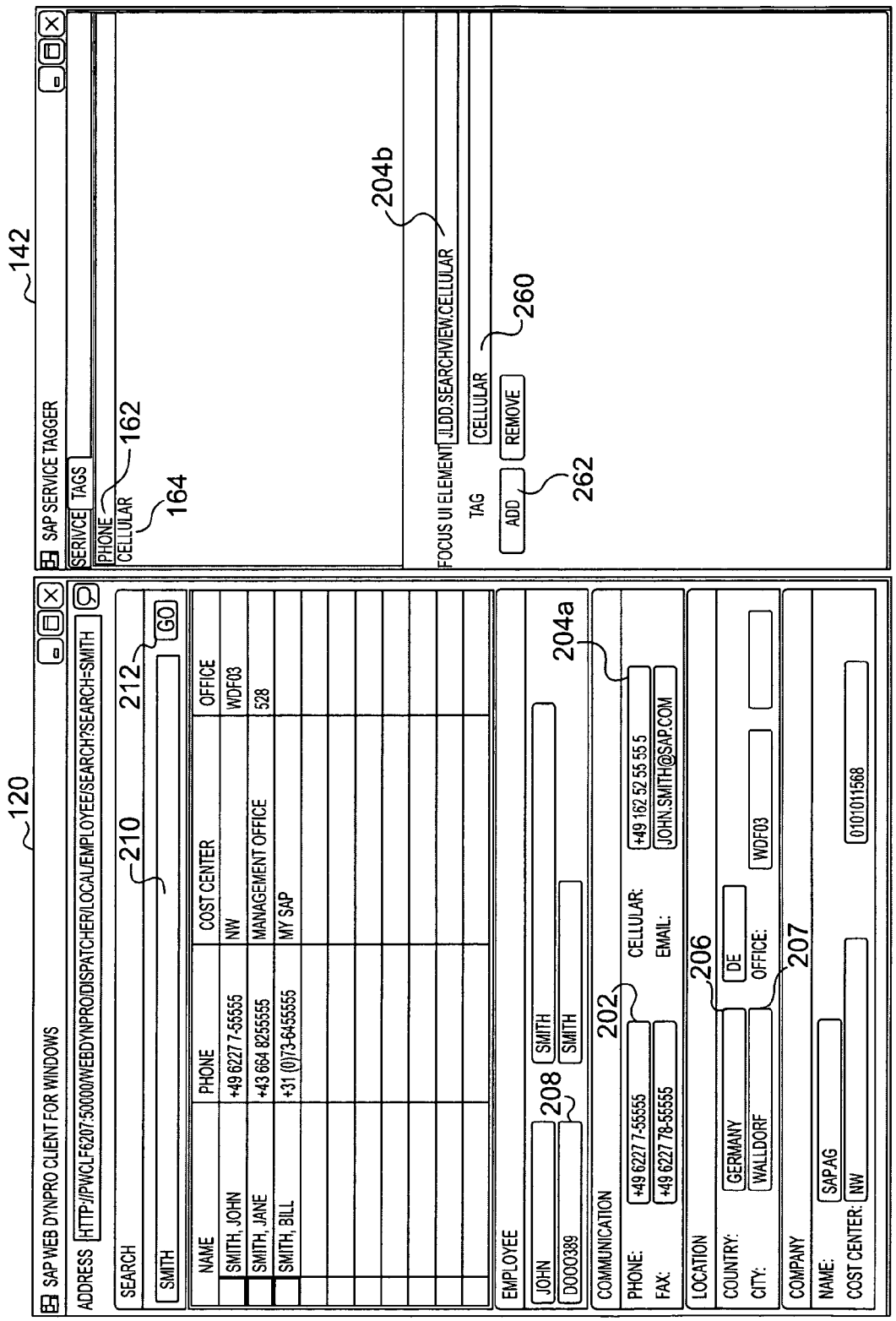
FIG. 2 illustrates a user interface and a graphical user interface (GUI) of a service tagger component.

FIG. 2 depicts an exemplary implementation of user interface 120 for interacting with a service containing employee information. FIG. 2 illustrates examples of elements, such as a UserID 208, a phone 202, a cellular 204, a country 206, a city 207, a search field 210, and a go button 212 for initiating a search for the employee identified in search field 210. The elements may also be associated with one or more tags. For example, an element for displaying a cellular phone number (e.g., cellular element 204a) may defined by the following XML format:

```
<UIElement>
    <Name> JLDD.SearchView.Cellular </ Name>
    <Tags>
        <string> Customer/Address/Cellular/Telephone/Number
        </string>
    </Tags>
</UIElement>
```

In the above example, the XML statement <string>Customer/Address/Cellular/Telephone.Number <string> represents tags (e.g., semantic identifiers) for the data value of the UI element (e.g., cellular element 204a).

In some implementations, tags will contain specific as well as generic semantic information. For example, a generic service may recognize (i.e., include as a placeholder names) "Number;" another service may recognize "Telephone/Number; a third service may recognize "Cellular/Telephone/Number;" and a fourth service may recognizes "Address/Cellular/Telephone/Number." In this example, a single UI element may be associated with all four tags "Address/Cellular/Telephone/Number." Accordingly, different services (e.g., generic to specific) may utilize in varying degrees the semantic information (from a generic tag to a very specific tag). For example, a service may include placeholder "Addresss" which includes all the semantic information cellular, telephone, and number, while another service may only include a placeholder "Number." In both cases, the placeholders may be replaced by the value of the same UI element tagged "Address/Cellular/Telephone/Number." In another layer of concatenation, the tag may be defined as "Customer/Address," enabling all of the semantic information associated with address (e.g., cellular, telephone, and number) to be associated with a "Customer." The "Customer/Address" example illustrates concatenated tags from a generic semantic (right) to a specific semantic (left) forming a so-called hierarchy of semantic information, all of which may be associated with the same UI element.

FIG. 2 illustrates that a tag Cellular 260 may be associated with the cellular UI element 204a-b using GUI 142. The elements and corresponding tags associated with user interface 120 may be stored in persistent cache 125a, portal content directory 178a, enterprise services repository 175a, or any other storage mechanism. In some implementations, SAP Web Dynpro (commercially available from SAP AG, Walldorf, Germany) may be used as a model-based development environment for generating user interface 120 using elements and tags, although other development environments may be used as well. The user interface 120 may also be implemented as a business client, such as a Web Dynpro Smart Client or a SAP GUI. In some implementations, the tags may be associated with elements of user interface 120 during the design of user interface 120.

The user interface 120 may also have access to one or more services. As used herein, a service represents an application, program, or web service that may be called. In some implementations, user interface 120 may access and interact with services that are provided by an enterprise services framework, a portal, or any other application or web service. For example, FIG. 2 depicts user interface 120 accessing an enterprise service for providing employee information. However, user interface 120 may be able to access any other service, such as a web-based service for providing maps, a web-based search engine, a service for providing employee pictures (or images), and a phone dialer. The services available to user interface 120 may be stored in a portal content directory 178a, enterprise services repository 175a, or any other appropriate mechanism.

FIG. 2 also depicts the GUI 142 of service tagger component 122. The service tagger component 122 may be implemented as a program or component, i.e., a small binary object (e.g., an applet) or program that performs a specific function and is designed in such a way to easily operate with other components and applications, such as user interface 120. The service tagger component 122 may perform a variety of functions so that elements of a user interface may be enhanced with one or more services each called using an URL including one or more placeholders replaced with the values of UI elements having tags with the same (or similar) name as the placeholder. For example, the service tagger component 122 may perform one or more of the following functions: associate tags with elements of a user interface, select services, select names for placeholders in a URL used to call a service, replace placeholders in a URL with the values of a tag having a same or similar name as the placeholder, and call a service using an URL including placeholders replaced with the values of UI elements.

Figure 3:
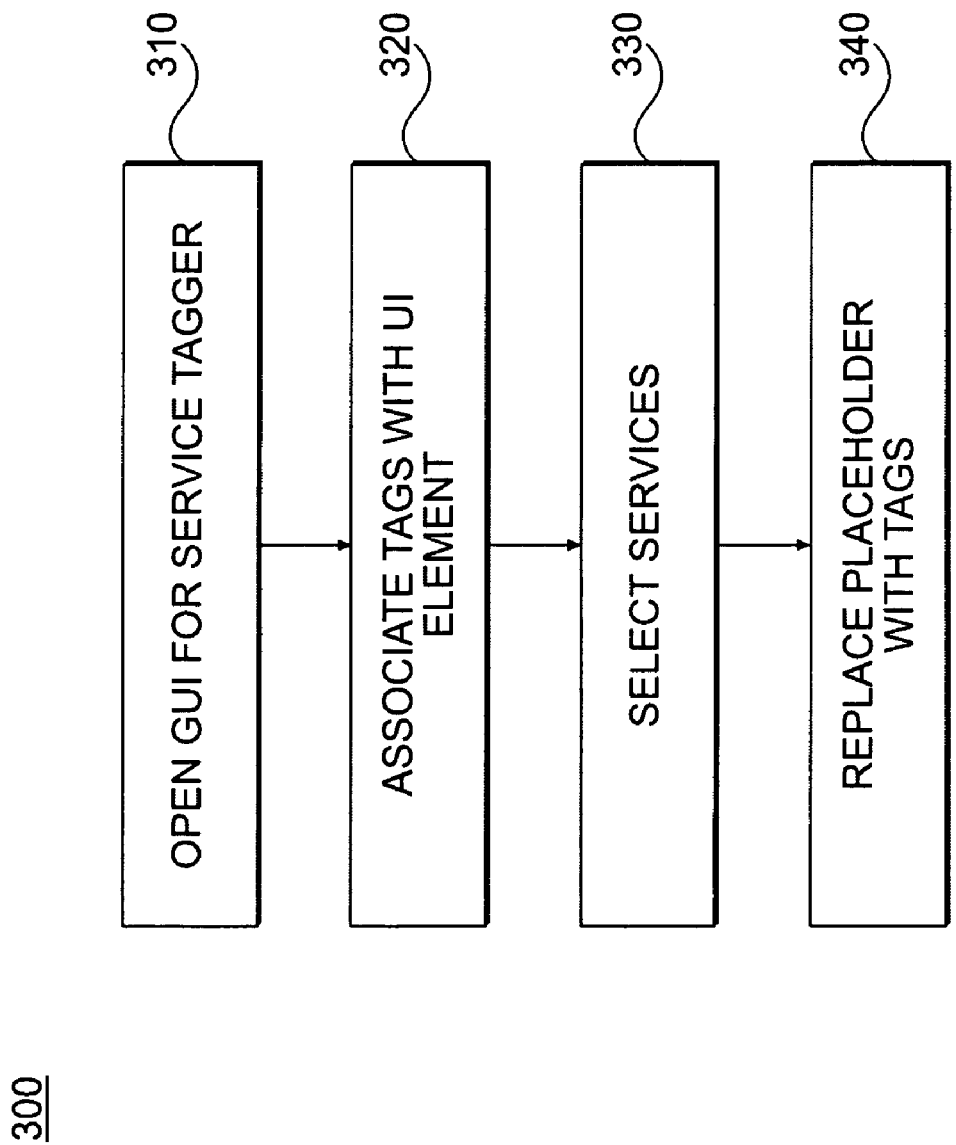
FIG. 3 illustrates a method for replacing placeholders with the values associated with UI element tags.

FIG. 3 depicts a method 300 for replacing URL placeholders with values associated with similarly named UI element tags. At 310, a user may open GUI 142 of service tagger component 122.

At 320, a user of GUI 142 may associate one or more tags with elements of user interface 122 and store the tags and associated elements in persistent cache 125a. Alternatively, the tags may be stored in server system 130 (e.g., in repository 175a), and persistent cache 125a may then be used to store locally (i.e., at client system 190) the state of the stored tags. Referring to FIG. 2, GUI 142 shows the tag "Cellular" 260 being associated with the UI element for Cellular 204a and 204b. When a user selects add 262, the Cellular tag 260 and associated UI Element Cellular 204b are stored, and the tag 164 appears at the GUI 142. FIG. 2 also depicts that the tag phone 162 has also been associated and stored. In some implementations, GUI 142 may be used to select tags and UI elements from repositories 175c or 178c or, alternatively, the UI elements may be stored as an XML file associated with a service at server 130.

Figure 4:
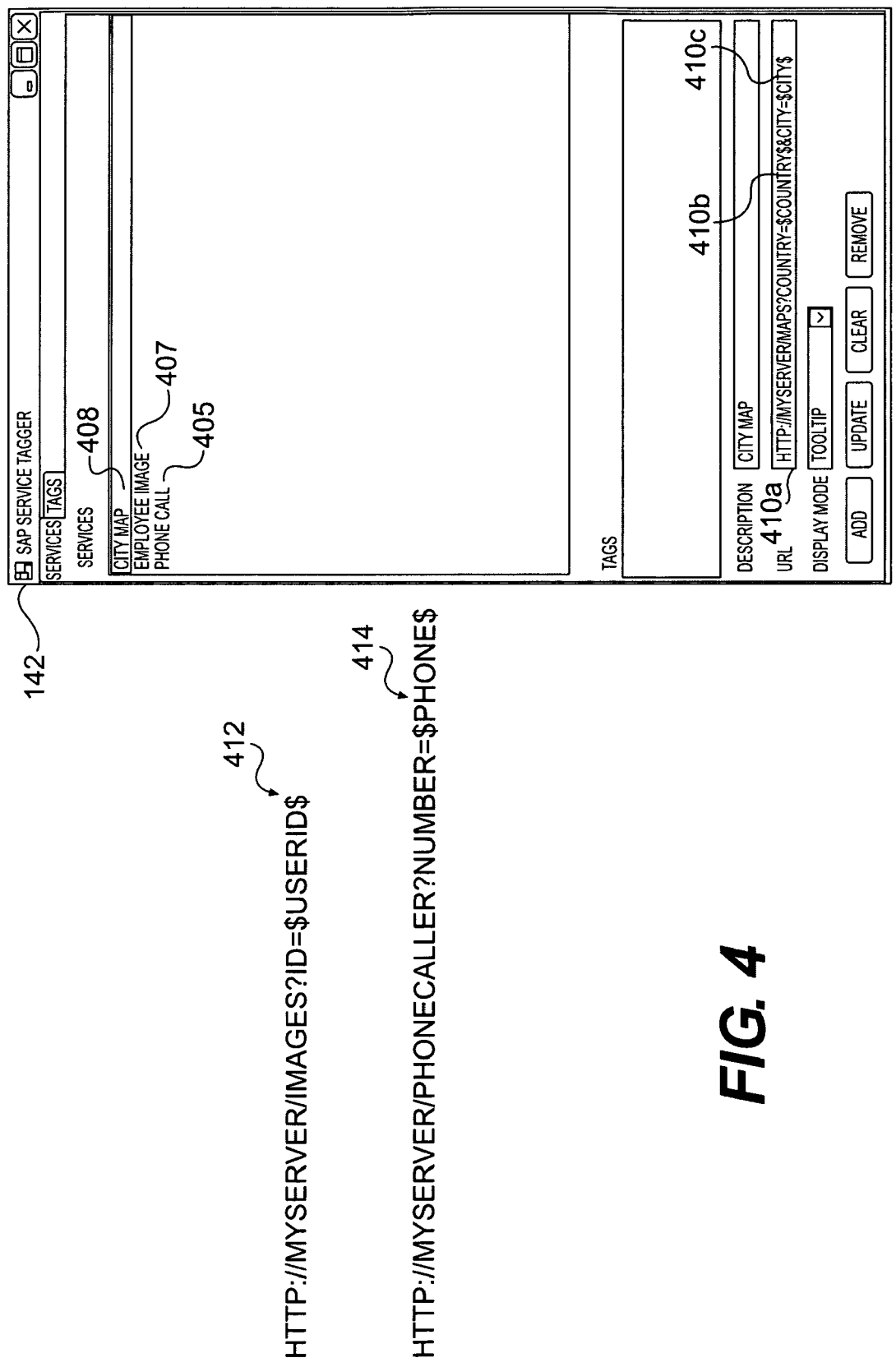
FIG. 4 illustrates the GUI of the service tagger component.

Referring again to FIG. 3, at 330, a user of GUI 142 may select one or more services and then store them (or their location) at server system 130 or cached in 125a. FIG. 4 depicts the services view of GUI 142 including selected services City Map 408, Employee Image 407, and Phone Call 405. FIG. 4 also depicts a URL (uniform resource locator) 410a for calling City Map service 408. Moreover, a user of GUI 142 may insert placeholders into the URL, so that the placeholders have the same name as the tags used for the UI elements. For example, the placeholder "$Phone$" 414 may be selected for the URL at FIG. 4. Similarly, the UI element phone 202 (FIG. 2) may be assigned UI tag "Phone."

Referring again to FIG. 3, at 340, service tagger component 122 may replace the one or more placeholders of a URL used to call a service with the values of any tags having the same (or similar name) as the placeholders. Referring again to FIG. 4, the City Map service may be called with the URL 410a. The URL 410a includes placeholders named "$Country$" 410b and "$City$" 410c. The UI elements 206 and 207 are associated with tags "Country" and "City." When the City Map service 408 is called using the URL 410a the placeholders "$Country$" 410b and "$City$" 410c are replaced with values corresponding to the UI elements tagged with "City" and "Country." In the example of user interface 120 at FIG. 2, service tagger component 122 replaces "$Country$" 410b and "$City$" 410c with the value "Germany" 206 and the value "Walldorf" 207. The City Map service 408 is called with the replaced values in the URL, and then returns a map corresponding to "$Country$" 410b and "$City$" 410c, i.e., a map or Walldorf, Germany.

FIG. 4 also depicts that the URL 412 includes a placeholder "$UserID," which has the same name as the tag "UserID" mapped to UI element 208. Accordingly, the service tagger component 122 replaces placeholder "$UserID$" with the value of tagged UI element 208, which in this example is D000389. The service at URL 412 is an Employee Image service 407, which is called with the placeholder replaced with D000389. The Employee Image service 407 then returns an employee image for employee D000389.

Figure 5:
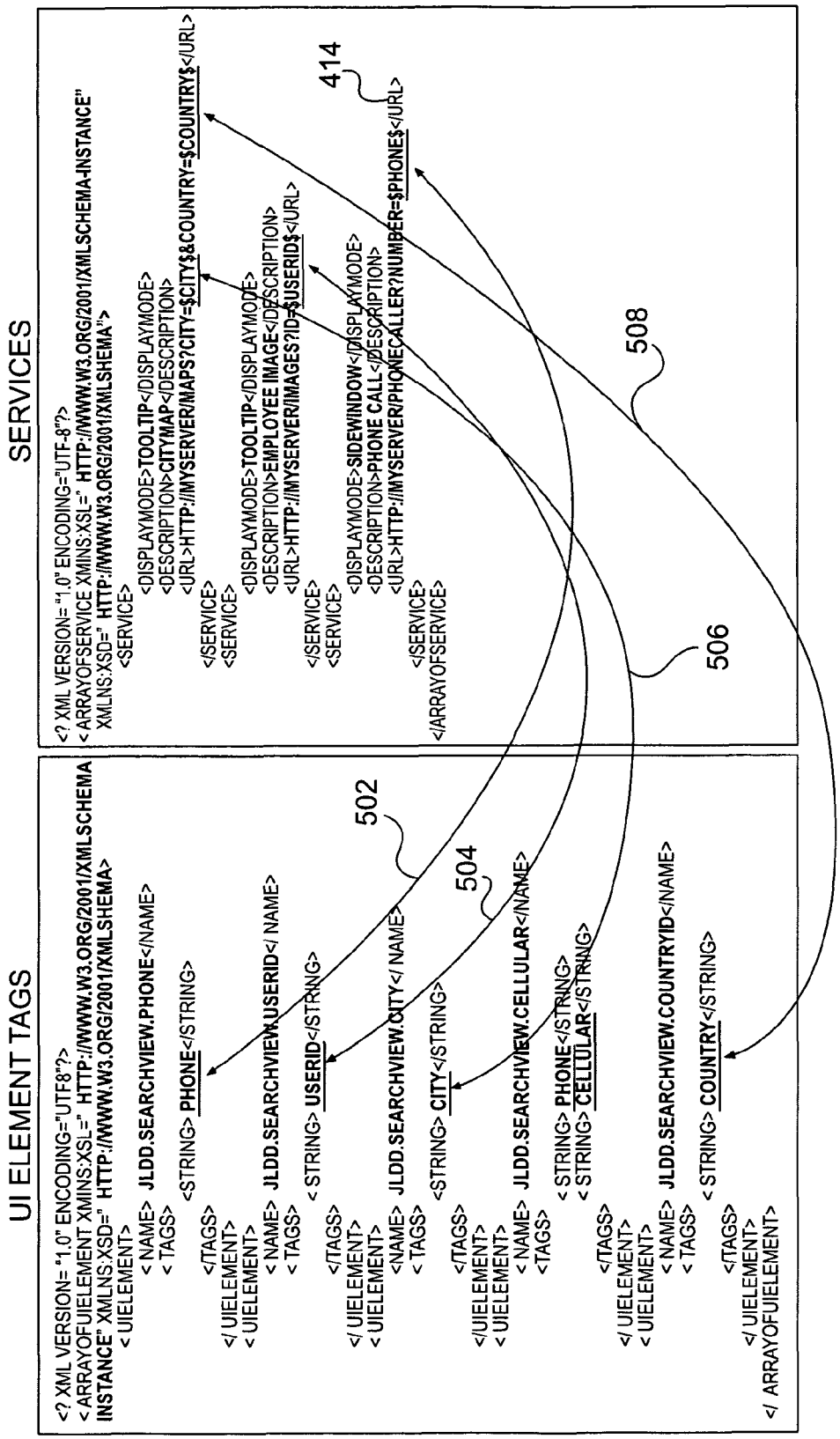
FIG. 5 illustrates UI element tags and placeholders used in connection with calling corresponding services.

FIG. 5 depicts an example of URL placeholders replaced with the values of similarly named tags associated with UI elements. The values of UI element tags "Phone", "UserID," "City," Phone", and "Country" are replaced with the placeholders corresponding to the services City Map, Employee Image, and Phone Caller. In some implementations, the XML for the tags (FIG. 5 left) and the XML for the services (FIG. 5 right) may be implemented as a single XML file including tagged start parameters and tagged UI elements for each separate service.

During runtime, the placeholders used in the URL are replaced with the values associated with the tags of the UI elements. For example, if a user of user interface 120 selects phone 202 (FIG. 2), the service tagger component 122 replaces the placeholder "$Phone$" in URL 414 (FIG. 5) with the value corresponding to the similarly named tag "Phone" associated with UI element 202. In particular, the placeholder "$Phone$" is replaced with the value (or contents) of the tag corresponding to phone UI element 202 (see, e.g., 49 6227 7 55555 at FIG. 2) to yield the following URL 414:

http://myServer/phoneCaller?number=49 6227 7 55555.

The service tagger component 122 would thus call the Phone Call service at the above URL using 49 6227 7 55555. The user interface thus receives information (in this example phone call related information) corresponding to the phone UI element 202.

Figure 6:
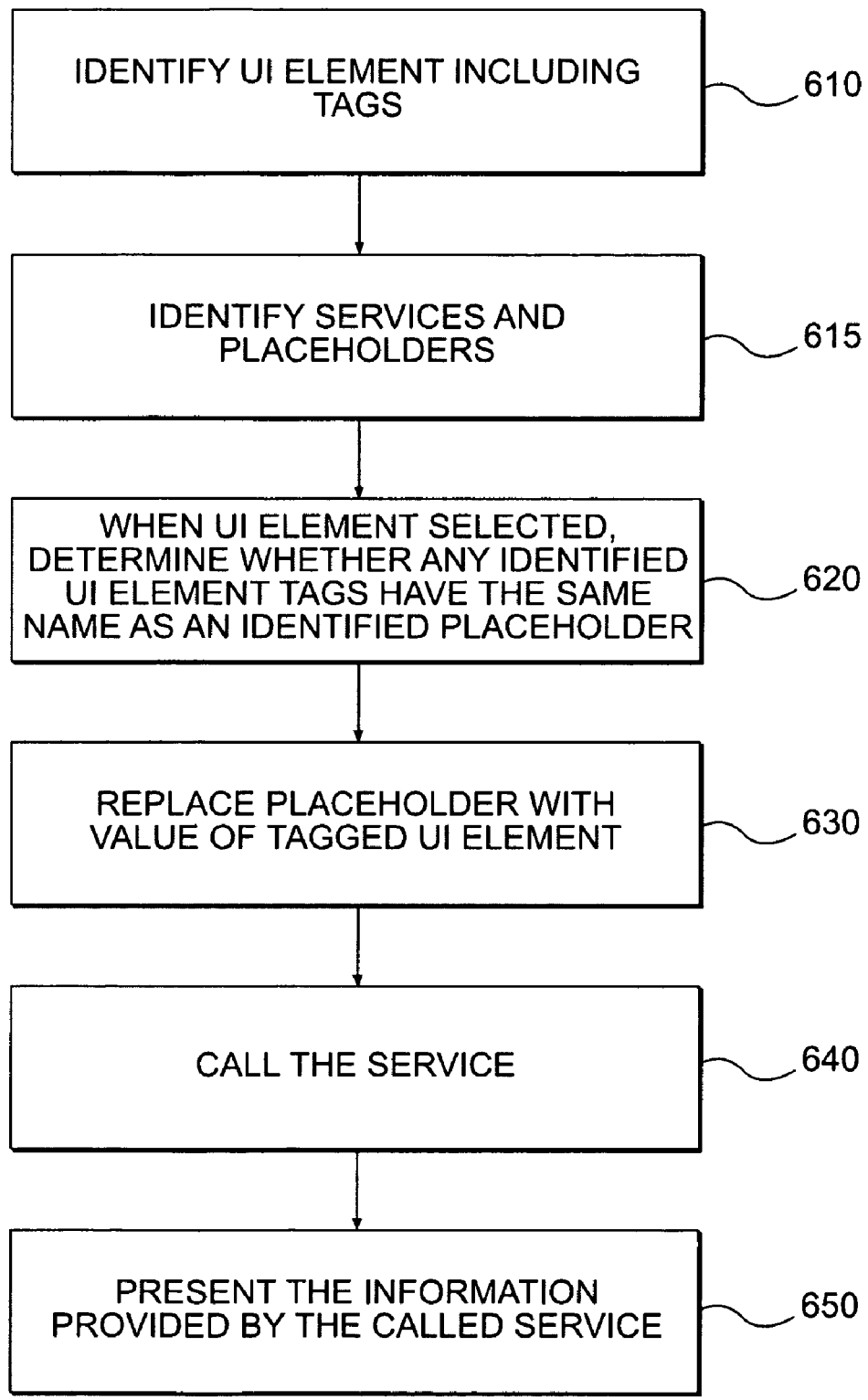
FIG. 6 illustrates a method for calling a service enabled tagged user interface.

FIG. 6 depicts a method for providing to elements of a user interface a service enabled with tags. At 610, service tagger component 122 may identify elements of user interface 120 that have tags, as described above with respect to 320 at FIG. 3. At 615, the service tagger component 122 may identify one or more services and their corresponding placeholders. At 620, when a user selects an element of user interface 120, the service tagger component 122 determines whether any services identified in 615 have placeholders with names that are the same (or similar) to tags associated with the selected element. When that is the case, at 630, the service tagger component 122 may then replace the placeholders in the URL of the service with the value associated with the tag of the selected UI element. At 640, the user interface 120 calls the service using the replaced value. At 650, the user interface 120 presents information provided by the service called using the replaced value.

Figure 7:
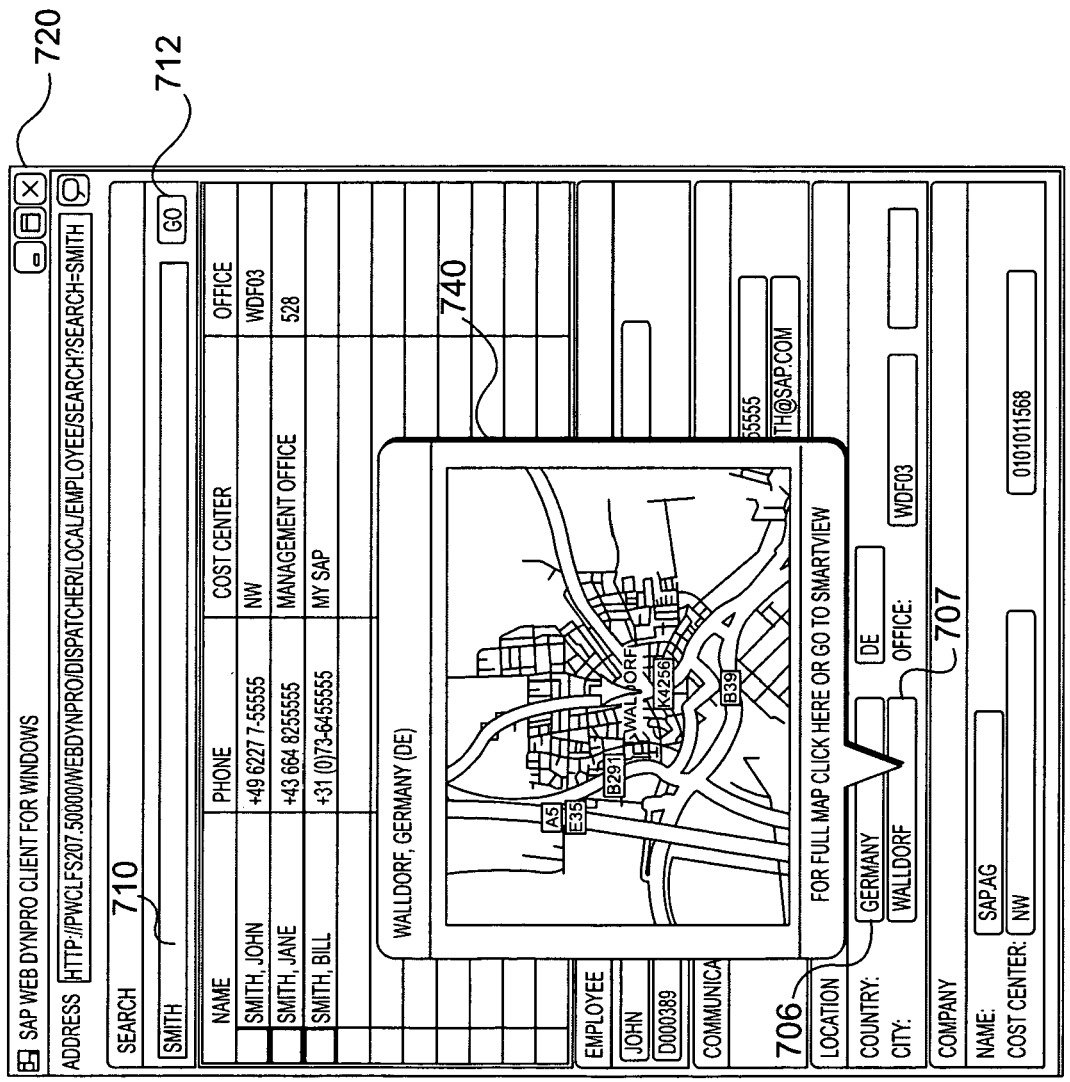
FIGS. 7-9 illustrate exemplary user interfaces enhanced with the methods of FIGS. 3 and 6.

FIG. 7 depicts a user interface 720 including elements having tags to enable a service. For example, a user of user interface 720 may search for an employee named "Smith 710" and selects go 712 to initiate the search. The employee service returns the employee information depicted in user interface 720. In addition, a City Map service provides information in the form of map 740. In this example, the user interface 720 calls the City Map service. The placeholders of the URL of the City Map service are replaced with the value of the tags associated with elements City 707 (e.g., Walldorf) and Country 706 (e.g., Germany). As such, the user interface 720 is enriched with the City Map service and the map (e.g., a map of Walldorf Germany) 740. In some implementations, as soon as a user performs a search for "Smith," the map 740 is provided to user interface 720. In other implementations, a user may select (e.g., click or hover) over location elements 706 and 707 to initiate the call to the City Map service and be presented with map 740.

Figure 8:
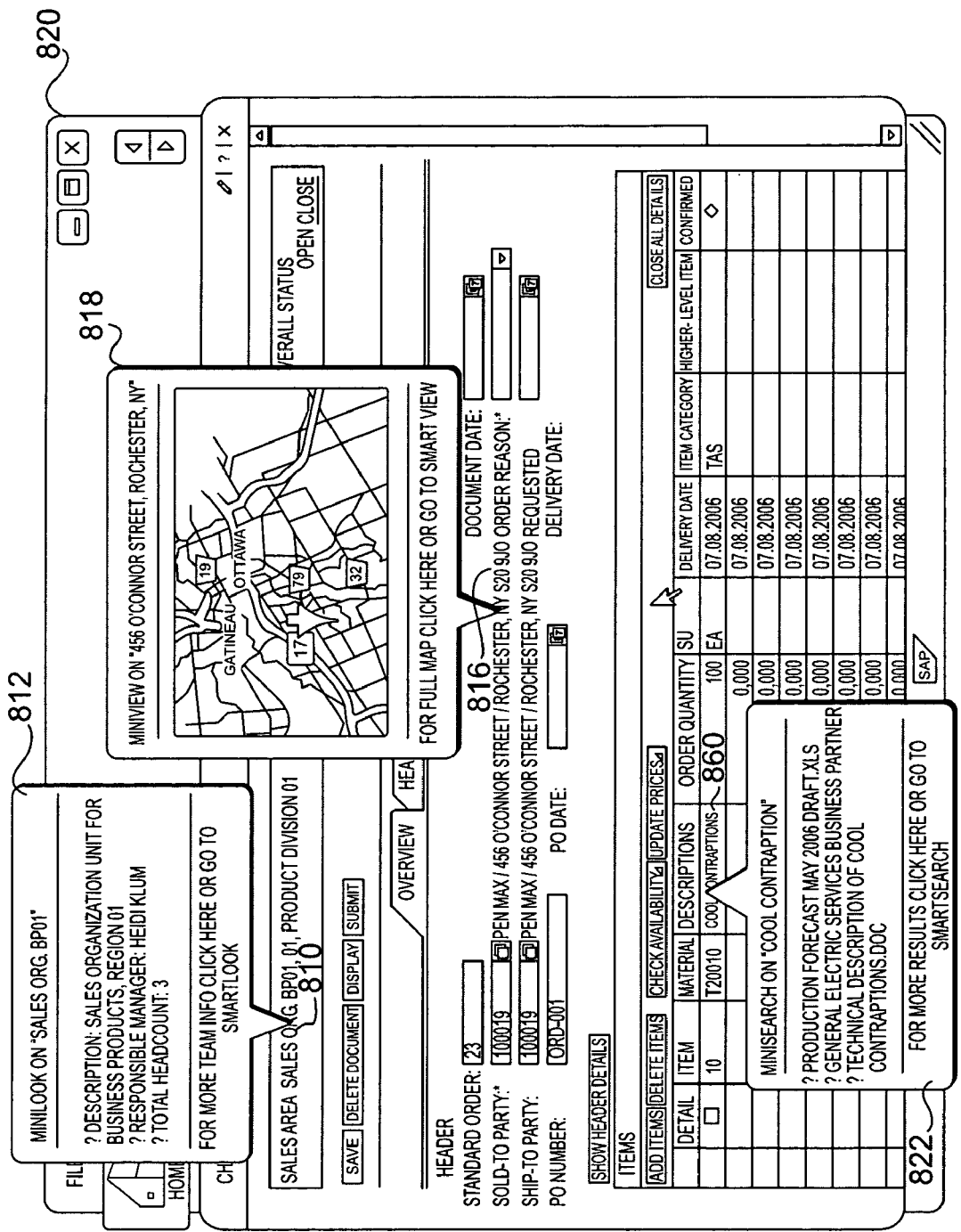

FIG. 8 depicts another user interface 820 including elements having tags to enable a service. When a user hovers over an element of user interface 820, a service is called with placeholders in the URL replaced with values associated with similarly named tags. The user interface 820 may present information from the called service as a so-called tool tip to provide additional information to a user of user interface 820. For example, when a user selects (e.g., hovers) over sales organization element 810, a call is initiated to a service called with placeholders replaced with the values of a tag having the same name as the placeholder. The service returns information 812. Similarly, when a user selects address element 816 or item description 860, calls are made to corresponding services, and information is presented as tool tip information 818 and 860.

Figure 9:
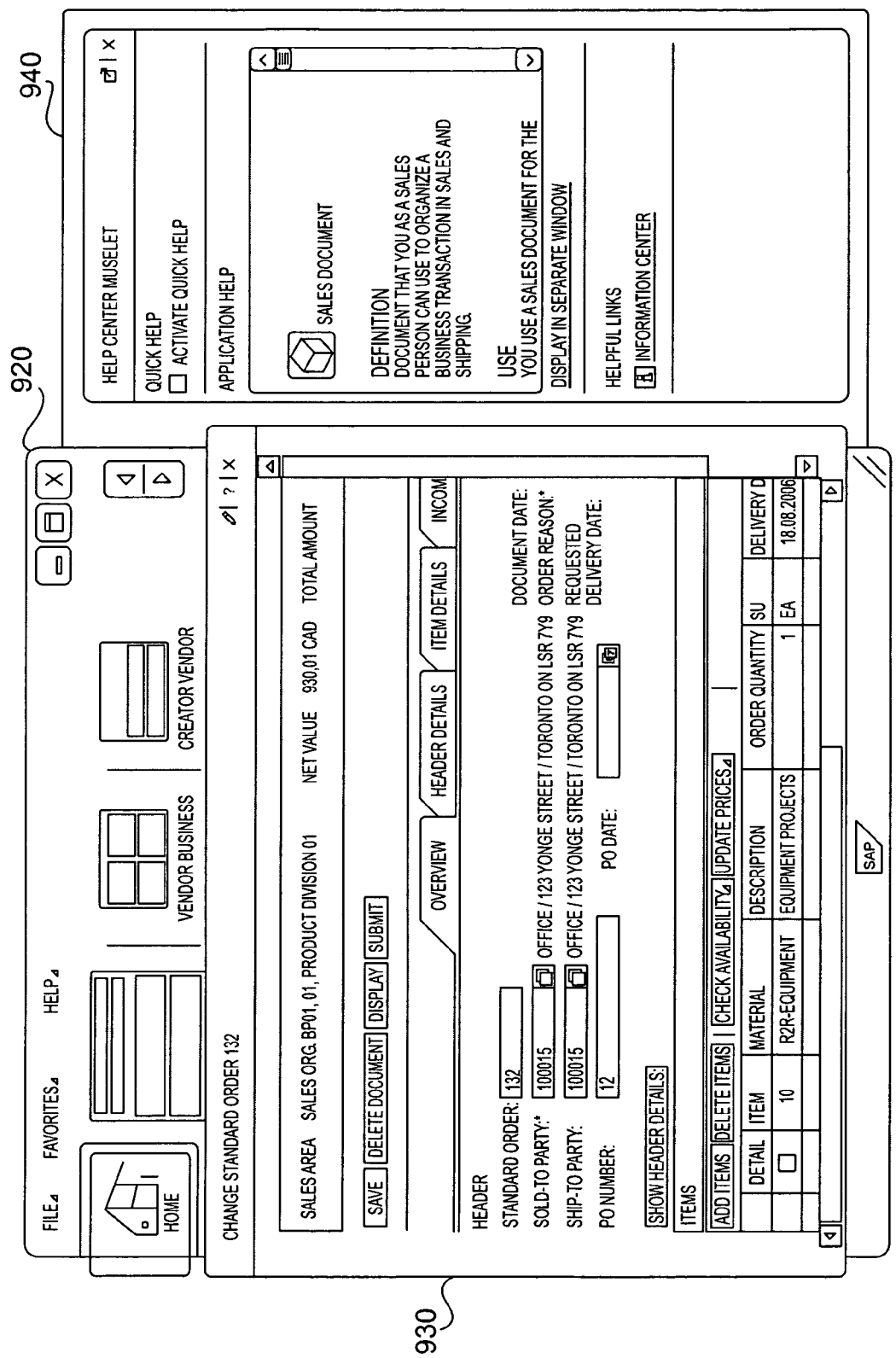

FIG. 9 depicts another user interface 920 including elements having tags to enable a service. Unlike the examples of FIG. 8, the information received from the service is presented as a separate window rather than a tool-tip. When a user selects an element of user interface 920, the service tagger component 122 determines whether any services have placeholders with names similar to tags of the selected element. For example, a user may hover over an element of sales order 930. When that is the case, a call is made to a corresponding service, as described above with respect to FIG. 6. In this example, information provided by the service is presented in a separate window, such as window 940, or as a Muselet.

The information presented by the service may enrich a user's experience with the user interface and it elements. For example, user interface 920 may interface to a flight reservation system used by a travel agent. In this example, as the travel agent selects different destinations, the user interface (enhanced with service tagger component 122) may call a service with a placeholder replaced with the value of the tags associated with the destinations (e.g., Berlin, Paris, and London). The service may return an image of the destination, which may be presented in a separate window or in a separate display screen.

In another exemplary use, a banker may prepare financial papers, such as a mortgage loan application. As the banker processes the mortgage loan through a user interface, the user interface 120 (enhanced with service tagger component 122) may call a service with URL placeholders replaced with values associated with tags. In this case, the tags correspond to specific values of the mortgage loan, such as interest rate, term, and amount financed. For example, the called service may return a graph showing the amortization schedule, which may be presented in a separate window or a separate display screen to the consumer as the banker processes the mortgage loan.

Other environments where the service enabled tagged user interface described above may be used include medical imaging, financial services, insurance, and sales.

The subject matter described above thus provides a user interface with services and building blocks that can be utilized at the user interface to enhance a user's experience as well as providing a more contextual, intuitive, and adaptive user interface. Moreover, the subject matter described herein provides a service enabled, tagged user interface that can call up additional services via one or more service tags without requiring modification to the service or application being called.

Although the above examples depict a service being called using URLs, the calls to the service may take other forms including for example: a command line including placeholders (e.g., mail to:$Email$); or a component (assembly, class name), e.g. a widget connected to the user interface. A widget that is started may stay in connection with the initiating user interface application and its elements. A map widget (driven by address tags like: country, city, street) may be started and connected to the corresponding fields of an application. Whenever the address changes on the application, the widget adopts the new field values and displays the appropriate map. Moreover, the term "user" may refer to a person or another processor, such as a computer.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed is:

1. A computer-implemented method comprising:
    identifying, at a service tagger component, an element of a user interface that has an associated tag, the user interface being displayed to a user via a client system;
    identifying, at the service tagger component, a service and a placeholder corresponding to the service, the service being callable from within the user interface by a uniform resource locator, the uniform resource locator comprising the placeholder corresponding to the service, the placeholder including an identifier;
    determining, when the user selects the element in the user interface, that the identifier of the corresponding placeholder of the service is similar to the associated tag of the element;
    replacing the placeholder in the uniform resource locator with a value corresponding to the element associated with the tag;
    calling the service using the uniform resource locator that included the placeholder replaced by the value corresponding to the element associated with the tag; and
    receiving, at the user interface, information from the called service, the information corresponding to the element selected by the user in the user interface, the information being provided from the service called using the uniform resource locator with the value that replaced the placeholder of the uniform resource locator that included the identifier determined to be similar to the tag associated with the element.

2. The computer-implemented method of claim 1 further comprising:
    associating the element of the user interface to the tag; and
    selecting the service from a repository.

3. The computer-implemented method of claim 1 further comprising: the value comprising a character string value associated with the associated tag.

4. The computer-implemented method of claim 1, wherein calling the service further comprises: selecting the identifier of the placeholder to be the same as the tag.

5. The computer-implemented method of claim 1, further comprising: presenting in a separate window, the received information from the called service.

6. The computer-implemented method of claim 1, wherein the service comprises one of the following: a web service, an enterprise service, and an application.

7. The computer-implemented method of claim 1 wherein the tag comprises a concatenated tag comprising two other tags.

8. The computer-implemented method of claim 7, wherein the concatenated tag comprises a hierarchy of generic semantic information to specific semantic information.

9. The computer-implemented method of claim 1, wherein the element is a search field and the value is a text string entered by a user in the search field.

10. The computer-implemented method of claim 1, wherein the value of the tag associated with the element is provided by user interaction with a second element displayed in the user interface.

11. The method of claim 1, wherein at least one element in the user interface is associated with a plurality of tags that are each associated with respective different services that include respective placeholders corresponding to one of the plurality of tags, such that any of the respective different services that needs to be called in response to selection of one of the at least one element has its respective one of the plurality of tags associated with the one of the at least one element replaced by a value corresponding to the one of the at least one element.

12. An article comprising a machine-readable storage medium embodying instructions that when performed by one or more machines result in operations comprising:
    identifying, at a service tagger component, an element of a user interface that has an associated tag, the user interface being displayed to a user via a client system;
    identifying, at the service tagger component, a service and a placeholder corresponding to the service, the service being callable from within the user interface by a uniform resource locator, the uniform resource locator comprising the placeholder corresponding to the service, the placeholder including an identifier;

determining, when the user selects the element in the user interface, that the identifier of the corresponding placeholder of the service is similar to the associated tag of the element;

replacing the placeholder in the uniform resource locator with a value corresponding to the element associated with the tag;

calling the service using the uniform resource locator that included the placeholder replaced by the value corresponding to the element associated with the tag; and receiving, at the user interface, information from the called service, the information corresponding to the element selected by the user in the user interface, the information being provided from the service called using the uniform resource locator with the value that replaced the placeholder of the uniform resource locator that included the identifier determined to be similar to the tag associated with the element.

13. The article of claim 12 wherein the operations further comprise:
associating the element of the user interface to the tag; and
selecting the service from a repository.

14. The article of claim 12 wherein the operations further comprise: the value comprising a character string value associated with the associated tag.

15. The article of claim 12, wherein calling the service further comprises: selecting the identifier of the placeholder to be the same as the tag.

16. The article of claim 12 wherein the operations further comprise: presenting in a separate window, the received information from the called service.

17. The article of claim 12, wherein the service comprises one of the following: a web service, an enterprise service, and an application.

18. The article of claim 12 wherein the tag comprises a concatenated tag comprising two other tags.

19. The article of claim 18, wherein the concatenated tag comprises a hierarchy of generic semantic information to specific semantic information.

20. A computer-implemented method comprising:
associating an element of a user interface with one or more semantic identifiers;

storing the one or more semantic identifiers in a repository accessible by the service tagger component as one or more tags associated with the element;

displaying the user interface via a client system;

receiving an input to the element that provides one or more corresponding values associated with the one or more of the tags;

executing a call to a service associated with the element, the executing comprising checking one or more placeholders in a uniform resource locator (URL) that calls the service to determine that the one or more placeholders have similar placeholder identifiers to the one or more tags;

replacing the one or more placeholders in the URL with the one or more values;

calling the service with the URL comprising the one or more values associated with the one or more tags of the element replacing the one or more placeholders; and receiving, at the user interface, information from the called service, the information corresponding to the element selected by the user in the user interface, the information being provided from the service called using the uniform resource locator with the one or more values that replaced the one or more placeholders in the URL that included the identifiers determined to be similar to the one or more tags associated with the element.

* * * * *